(12) United States Patent
Smith et al.

(10) Patent No.: US 9,020,689 B2
(45) Date of Patent: Apr. 28, 2015

(54) METHOD FOR REAL-TIME MODEL BASED STRUCTURAL ANOMALY DETECTION

(75) Inventors: Timothy A. Smith, Webster Groves, MO (US); James M. Urnes, Sr., Bridgeton, MO (US); Eric Y. Reichenbach, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 414 days.

(21) Appl. No.: 13/236,448

(22) Filed: Sep. 19, 2011

(65) Prior Publication Data

US 2013/0073141 A1 Mar. 21, 2013

(51) Int. Cl.
*G01M 17/00* (2006.01)
*G05B 23/02* (2006.01)
*B64D 45/00* (2006.01)

(52) U.S. Cl.
CPC .... *G05B 23/0254* (2013.01); *B64D 2045/0085* (2013.01)

(58) Field of Classification Search
CPC .......... G05B 23/0243; G05B 23/0251; G05B 23/0254
USPC .............. 701/32.9, 29.1; 703/2, 7, 8
See application file for complete search history.

(56) References Cited

U.S. PATENT DOCUMENTS

| | | | |
|---|---|---|---|
| 5,195,046 A | 3/1993 | Gerardi et al. | |
| 6,006,163 A | 12/1999 | Lichtenwalner et al. | |
| 6,748,791 B1 | 6/2004 | Georgeson et al. | |
| 7,298,152 B1 | 11/2007 | Wilke et al. | |
| 7,469,595 B2 | 12/2008 | Kessler et al. | |
| 2004/0199368 A1* | 10/2004 | Bechhoefer | 703/7 |
| 2006/0064291 A1* | 3/2006 | Pattipatti et al. | 703/14 |
| 2007/0144396 A1 | 6/2007 | Hamel et al. | |
| 2008/0004840 A1* | 1/2008 | Pattipatti et al. | 702/183 |
| 2008/0140273 A1* | 6/2008 | Deker | 701/14 |
| 2008/0154458 A1 | 6/2008 | Brandstetter et al. | |
| 2011/0288836 A1* | 11/2011 | Lacaille et al. | 703/2 |
| 2012/0310449 A1* | 12/2012 | Hinnant et al. | 701/3 |

FOREIGN PATENT DOCUMENTS

| | | |
|---|---|---|
| EP | 1420153 A2 | 5/2004 |
| EP | 2026158 A2 | 2/2009 |
| EP | 2175336 A1 | 4/2010 |

OTHER PUBLICATIONS

EP 12185105.9 Extended European Search Report of European Patent Office, Aug. 13, 2013.

(Continued)

*Primary Examiner* — John Q Nguyen
*Assistant Examiner* — Jordan S Fei
(74) *Attorney, Agent, or Firm* — Ameh IP; Elahe Toosi; Lowell Campbell

(57) ABSTRACT

A system and methods for real-time model based vehicle structural anomaly detection are disclosed. A real-time measurement corresponding to a location on a vehicle structure during an operation of the vehicle is received, and the real-time measurement is compared to expected operation data for the location to provide a modeling error signal. A statistical significance of the modeling error signal to provide an error significance is calculated, and a persistence of the error significance is determined. A structural anomaly is indicated, if the persistence exceeds a persistence threshold value.

20 Claims, 6 Drawing Sheets

(56) References Cited

OTHER PUBLICATIONS

Philippe Goupil et al., "Oscillatory failure case detection in the A380 electrical flight control system by analytical redundancy", Control Engineering Practice, Pergamon Press, Oxford, GB vol. 18, No. 9, May 23, 2009, pp. 1110-1119, XP027230377, ISSN: 0967-0661 [retrieved on May 23, 2001]—the whole document.

* cited by examiner

METHOD FOR REAL-TIME MODEL BASED STRUCTURAL ANOMALY DETECTION

GOVERNMENT RIGHTS

This invention was made with Government support under Contract Number NND08AA66C awarded by the NASA. The government has certain rights in this invention.

FIELD

Embodiments of the present disclosure relate generally to structural anomaly detection. More particularly, embodiments of the present disclosure relate to real-time structural anomaly detection.

BACKGROUND

Vehicle or aircraft structures are typically subject to a variety of exogenous forces throughout their operational life; both expected operational forces and unexpected forces. Operational health of such structures may be adversely affected by an anomalous structural response to the operational forces and unexpected forces. Operational forces such as changes in aerodynamic loading and unexpected forces such as wind gusts may result in non-optimal structural conditions.

SUMMARY

A system and methods for real-time model based vehicle structural anomaly detection are disclosed. A real-time measurement corresponding to a location on a vehicle structure during an operation of the vehicle is received, and the real-time measurement is compared to expected operation data for the location to provide a modeling error signal. A statistical significance of the modeling error signal to provide an error significance is calculated, and a persistence of the error significance is determined. A structural anomaly is indicated if the persistence exceeds a persistence threshold value.

In this manner, a nominal model of a structural behavior of the vehicle is compared with a sensed response. A statistical analysis of modeling errors provides indication of anomalous structural behavior; indicating the structural anomaly to the vehicle structure. A control mechanism can be activated to compensate for the structural anomaly in response to indicating the structural anomaly. Thereby, structural life of the vehicle is prolonged and time between maintenance events is extended.

In an embodiment, a method for real-time model based vehicle structural anomaly detection receives a real-time measurement corresponding to a location on a vehicle structure during an operation of the vehicle. The method further compares the real-time measurement to expected operation data for the location to provide a modeling error signal, and calculates a statistical significance of the modeling error signal to provide an error significance. The method further determines a persistence of the error significance, and indicates a structural anomaly, if the persistence exceeds a persistence threshold value.

In another embodiment, a real-time model based structural anomaly detection system comprises a structural anomaly detection module and an anomaly mitigation module. The structural anomaly detection module is operable to receive a real-time measurement corresponding to a location on a vehicle structure during an operation of the vehicle, and compare the real-time measurement to expected operation data for the location to provide a modeling error signal. The structural anomaly detection module is further operable to calculate a statistical significance of the modeling error signal to provide an error significance, and determine a persistence of the error significance. The structural anomaly detection module is further operable to indicate a structural anomaly, if the persistence exceeds a persistence threshold value. The anomaly mitigation module is operable to activate a control mechanism to compensate for the structural anomaly, if the structural anomaly is indicated.

In yet another embodiment, a method for alleviating a structural anomaly obtains a modeling error signal of a structure, and assesses a probability that the modeling error signal is significantly away from zero by computing a Probability of False Alarm (Pfa) to provide an error significance. The method further inputs a unity signal to a first order filter when the error significance falls below a Pfa threshold value, and indicates a structural anomaly condition when an output of the first order filter is sufficiently close to one.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control laws, control systems, measurement techniques, measurement sensors, strain gauges, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, detecting anomaly in an aircraft structure. Embodiments of the disclosure, however, are not limited to such aircraft structure, and the techniques described herein may also be utilized in other applications. For example but without limitation, embodiments may be applicable to manned and unmanned ground, air, space, water and underwater vehicles, buildings, windmills, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
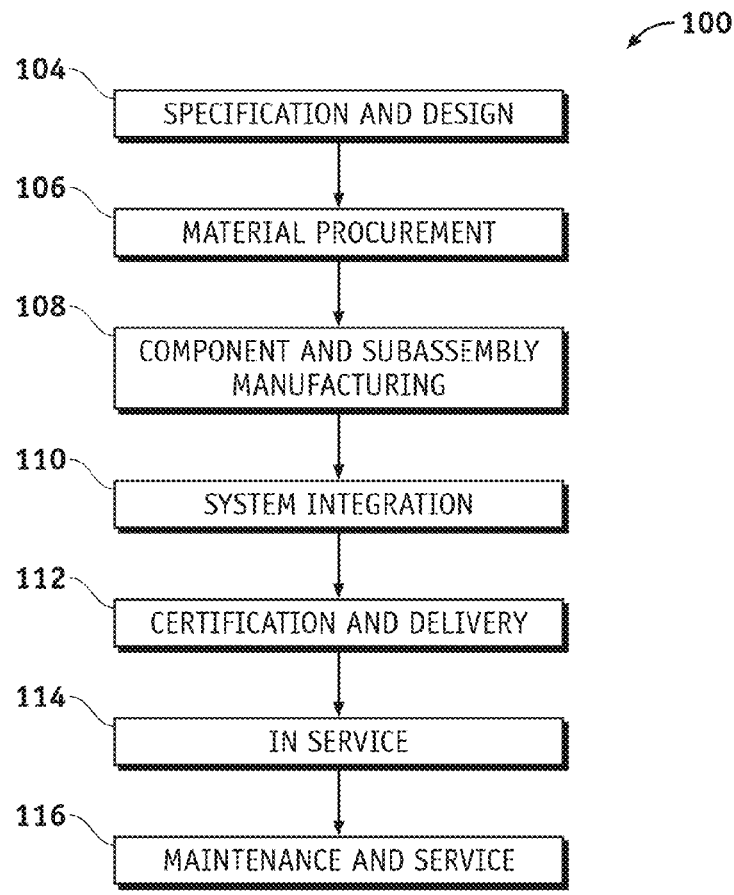
FIG. 1 is an illustration of a flow diagram of an exemplary aircraft production and service methodology.
Figure 2:
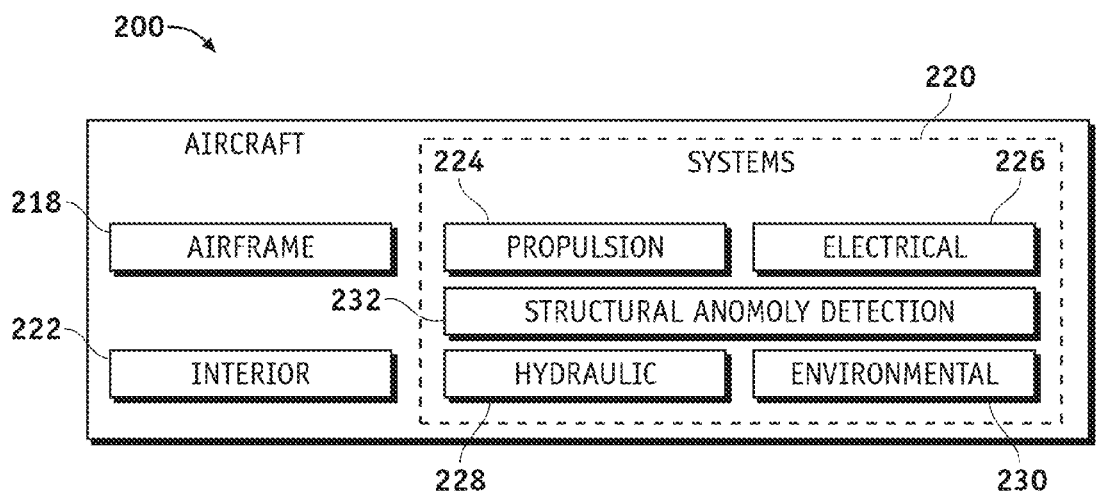
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, an environmental system 230, and a structural anomaly detection system 232. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Supplemental actuation systems may be used to detect anomalies of a structure. In contrast, embodiments of the disclosure require as input a healthy model of the aircraft structural behavior as a function of flight condition and aircraft state. The structural anomaly indication can be coupled with measured structural data in flight controls to limit maneuvering of a non-optimal aircraft structure to within an envelope that keeps structural loads for the aircraft at safe levels.

Embodiments of the disclosure provide a system and methods to detect real time structural anomaly of a structure such as an aircraft during flight. In flight anomaly detection can permit employment of flight controls that mitigate effects of structural anomaly; preventing more anomaly propagation that could lead to extensive repair of the aircraft. An indication of structural anomaly can also provide information to maintenance crews by indicating a need for on ground structural evaluation of the aircraft. This information can lengthen a required interval between on ground structural evaluations, and thus save cost.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, and the like. In this document, the term real-time refers to both real-time and near-real-time.

Figure 3:
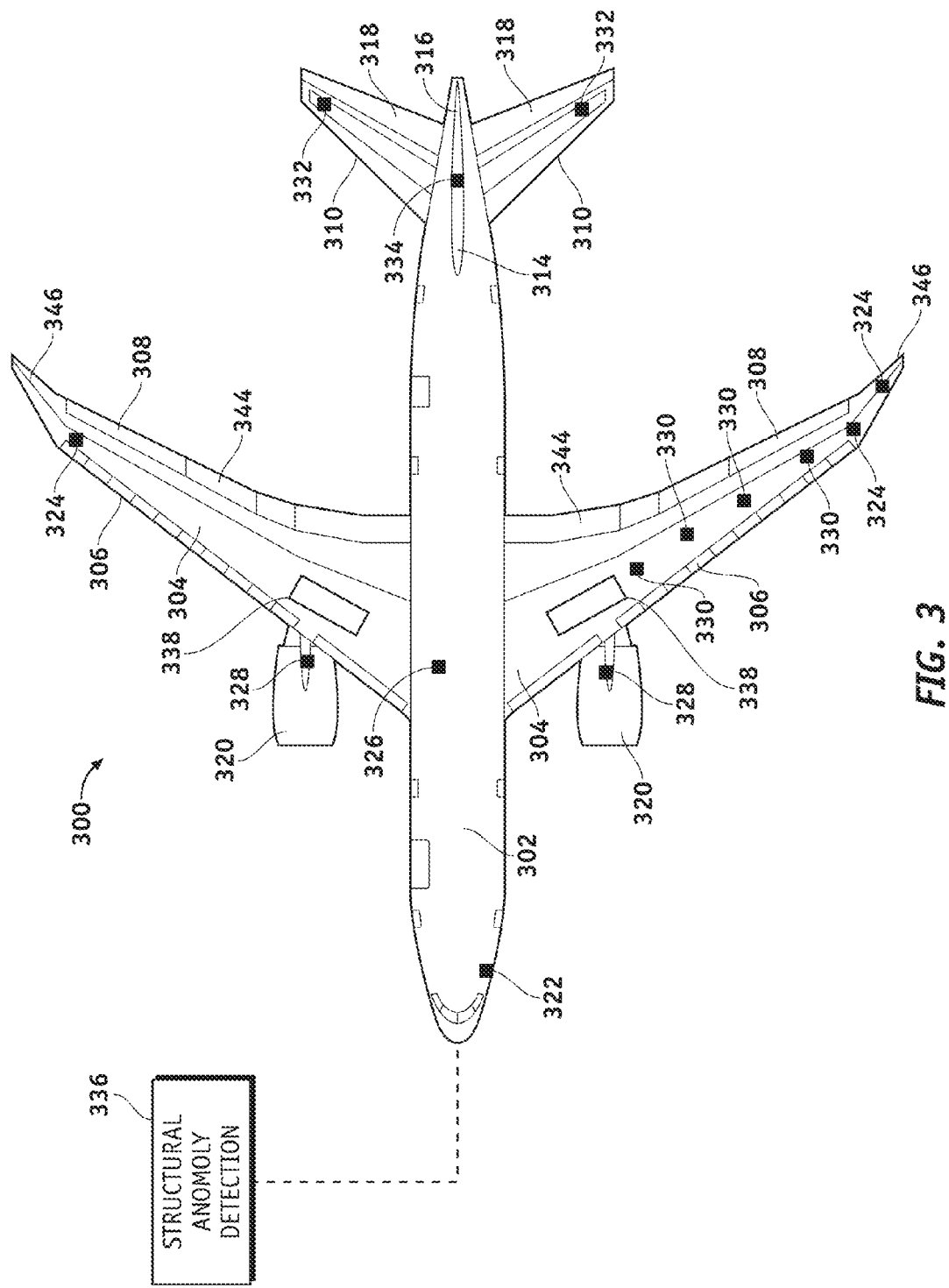
FIG. 3 is an illustration of an exemplary aircraft showing a structural anomaly detection system according to an embodiment of the disclosure.

FIG. 3 is an illustration of an exemplary aircraft 300 comprising a structural anomaly detection system 336 (system 336) for detecting structural anomaly of the aircraft 300 in real-time according to an embodiment of the disclosure. The aircraft 300 may comprise the structural anomaly detection system 336, a plurality of control surfaces and a plurality of lift surfaces, and a plurality of measurement units (MUs).

The structural anomaly detection system 336 is operable to detect structural anomaly of the aircraft 300 during flight as explained in more detail below. As mentioned above, in flight anomaly detection can permit employment of the flight controls that mitigate effects of the structural anomaly; preventing more anomaly propagation that could lead to extensive repair of the aircraft 300.

For example, the system 336 can activate the control surfaces and the lift surfaces in real-time to compensate for the structural anomaly. Alternatively, in other embodiments, the system 336 can mitigate effects of the structural anomaly by activation of, for example but without limitation, propulsion systems, active flow control, shaped metal alloys or other active structural materials that expand or contract as a function of a control signal, a combination thereof, or other activation mechanism.

The control surfaces may comprise, for example but without limitation, a landing gear door (not shown), a flight control surface such as a slat 306, an aileron 308, a tail 314, a rudder 316, an elevator 318, a flap 344, a spoiler 338, or other control surface. The lift surfaces may comprise, for example but without limitation, a fuselage 302, a wing 304, a canard (not shown), a horizontal stabilizer 310, or other lift surface.

The structural anomaly may comprise, for example but without limitation, an in-flight operation, a stress from wind shear on a lift surface such as the fuselage 302, a stress from a debris impact on a lift surface such as the horizontal stabilizer 310, a stress from a gust on a lift surface such as the wing 304, a vibration or flutter on the wing 304, a fuselage flexure such as flexure on the fuselage 302, an excessive bending of the fuselage 302, a propulsion system anomaly such as an anomaly in the propulsion system 320 (engine 320), an excessive linear displacement, an excessive angular displacement, a structural fatigue, a control surface anomaly, a lift surface anomaly such as a winglet 346 anomaly, or other structural anomaly.

The system 336 collects data from the measurement units (MUs). In one embodiment the MUs comprise, strain bridges/gages or transducers located at various measurement points of interest on the aircraft 300. Alternatively, the MUs may comprise inertial measurement units ("IMUs") located at various measurement points of interest on the aircraft 300. However, the strain bridges/gases may provide more accurate measurement responses than the IMUs.

The system 336 also collects data from a reference MU, which is preferably located in the fuselage 302. The reference MU is treated as a fixed reference point that is not subject to twisting, bending, or displacement during flight. The MU provides a measure of angle and velocity change over a small period of time. In practice, the system 336 may measure real-time twist relative to the reference MU but also may compute the twist between measurement MUs at various measurement points.

The MUs are installed in the aircraft 300 to provide in-flight wing/tail/fuselage twist and deflection data to a flight control system (not shown). The MUs shown in FIG. 3 generally may comprise, for example but without limitation, a reference navigation IMU 326 coupled to the processing module 410, a plurality of measurement navigation MUs 324/328/330/332/334 coupled to the processing module 410, and a GPS receiver (not shown) coupled to the system 336. A practical embodiment may comprise, for example but without limitation, any number of measurement units MUs or sensors located throughout the aircraft 300, and the location of such measurement units MUs need not be restricted to the locations shown in FIG. 3.

In the embodiment shown in FIG. 3, a commercial airplane is shown. It will be readily apparent to those of ordinary skill in the art, that the embodiment shown in FIG. 3 can have application or be adapted to non-traditional structures such as, but without limitation, high altitude long endurance vehicles whose entire structure may be a controllable highly flexible lift surface, or other vehicle.

Figure 4:
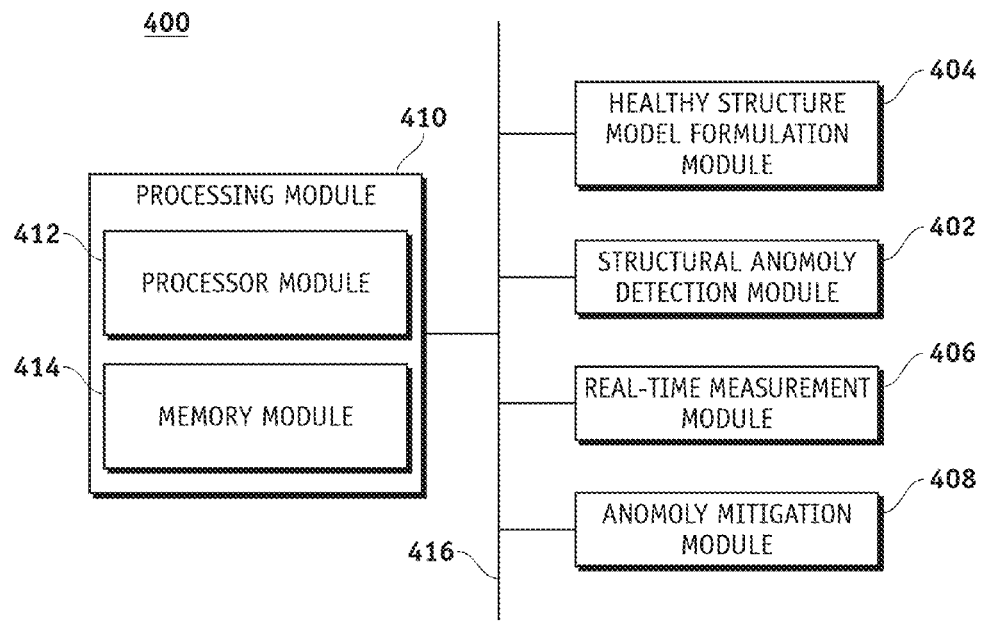
FIG. 4 is an illustration of an exemplary functional block diagram of a structural anomaly detection system according to an embodiment of the disclosure.

FIG. 4 is an illustration of an exemplary functional block diagram of a real-time model based structural anomaly detection system 400 (system 400, 336 in FIG. 3) suitable for detecting structural anomaly and operating one or more control mechanisms in real-time to compensate for the detected structural anomaly. The various illustrative blocks, modules, processing logic, and circuits described in connection with system 400 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

A processor may be realized as a microprocessor, a controller, a microcontroller, a state machine, and the like. A processor may also be implemented as a combination of computing devices, e.g., a combination of a digital signal processor and a microprocessor, a plurality of microprocessors, one or more microprocessors in conjunction with a digital signal processor core, or any other such configuration.

The system 400 may comprise, for example but without limitation, a desktop, a laptop or notebook computer, a handheld computing device (PDA, cell phone, palmtop, etc.), a mainframe, a server, a client, or any other type of special or general purpose computing device as may be desirable or appropriate for a given application or environment. The system 400 generally comprises a structural anomaly detection module 402, a healthy structure model formulation module 404, a real-time measurement module 406, an anomaly mitigation module 408, and a processing module 410. These components may be coupled to and communicate with each other via a network bus 416.

Figure 5:
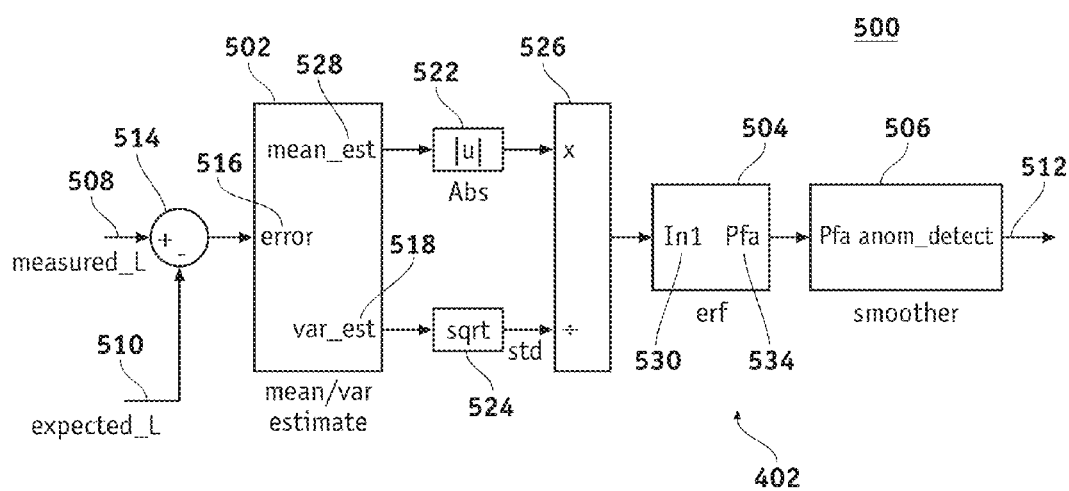
FIG. 5 is an illustration of an exemplary functional block diagram of a structural anomaly detection module according to an embodiment of the disclosure.

The structural anomaly detection module 402 is configured to detect at least one anomaly in the structure of the aircraft 300 based on a difference between a healthy aircraft response (expected response) and a real-time measurement (measured response) at a given location on the aircraft 300 as explained in more detail in the context of the discussion of FIG. 5.

The healthy structure model formulation module 404 may be located on-board the aircraft 300 and is configured to provide the healthy aircraft response for a given flight condition and aircraft state at the given location in the structure of the aircraft 300. The healthy aircraft response is used as an input to the structural anomaly detection module 402. The healthy aircraft response may comprise, for example but without limitation, a strain response, a vibration response, a stress response, a noise response, a temperature response, an optical response, and the like.

Further, the healthy aircraft response may comprise, for example but without limitation, nominal twist and twist gradients from tail to nose and wing tip to wing tip, nominal aircraft body bending, reference navigation MU 326 to each measurement unit MU 324/328-334, landing gear jerk and acceleration, desired control surface positions, desired lift surface positions based on current flight conditions (e.g., speed, altitude, Mach), accelerations, jerk, attitudes, rates, navigation state data, and the like. Aircraft parameters associated with these may comprise, for example but without limitation, altitude, airplane type, model, weight, and the like. The aircraft parameters may be compiled in real-time during a flight and later offloaded into a database to be used in the healthy structure model formulation module 404.

In one embodiment, the healthy aircraft response is obtained by a reading a sensor signal from the MUs during a healthy operation of the aircraft 300. The sensor signal is then stored in the memory module 414. An expected signature signal response is then formulated by the healthy structure model formulation module 404 representing a healthy operation of the aircraft 300 based on the sensor signal providing the expected operation data.

The real-time measurement module 406 is configured to receive real-time measurement for a given flight condition and a state of the aircraft 300 at the given location in the structure of the aircraft 300.

The real-time measurement can be obtained by the MUs such as strain gages located on the aircraft 300 as explained above. In one embodiment, the MUs measure a representative sensor signal during various operation of the vehicle on a periodic basis to obtain the real-time measurement. The real-time measurement is used as an input to the structural anomaly detection module 402. The real-time measurement may further be obtained, for example but without limitation, by a vibration sensor, a noise sensor, a temperature sensor, an optic sensor, and the like.

The anomaly mitigation module 408 is configured to activate a control mechanism in response to the structural anomaly detection module 402 warranting the detected structural anomaly to compensate for the detected anomaly. The activating of the control mechanism may comprise mechanism activation of, for example but without limitation, a control surface actuation, a lift surface actuation, a propulsive power alteration, active flow control, flow control actuation, actuation of shaped memory alloys or other active structural materials that expand or contract as a function of a control signal, a combination thereof, and the like.

The lift surfaces (e.g., wing, canard, fuselage) provide lift as a function of engine thrust, while the control surfaces (e.g., ailerons, flaps, rudder) may be moved by means of actuators to control the aircraft flight path, commonly called flight control. Additionally, actuators such as a skin/structure actuators and the like may be also be used for flexing the lift surfaces, to a more desirable (e.g., fuel efficient) shape based on measured flight conditions received from the real-time measurement module 406.

For example but without limitation, the anomaly mitigation module 408 is operable to control a position of the flap 344, control a position of the slat 306, control a position of the spoiler 338, and control positions of other control surfaces, via their respective actuators. Additionally, a series of actuators may be housed within the fuselage 302, tail section 340, and the wing 304 respectively, and operate based on commands received from the anomaly mitigation module 408. The anomaly mitigation module 408 receives data from the healthy structure model formulation module 404 that provides a desired position of the control surfaces and lift surfaces suitable to alleviate a structural anomaly such as a flexure, displacement or twist of structure of the aircraft 300.

For example, if the aircraft 300 receives a gust on one side, the structural anomaly detection module 402 detects a structural anomaly in the wing 304 and in response thereof the anomaly mitigation module 408 reacts quickly to keep stress from becoming too great to deform the wing 304. For another example, if turbulence leads to vibration or flutter, and causes the structure of the aircraft 300 to enter a resonant frequency, the motion is detected by the structural anomaly detection module 402. After the motion is detected, the anomaly mitigation module 408 generates a command for the flight control to null out the vibration or flutter. In another example, the system 400 can also alleviate stress on at least a part of a fuselage such as an upper mid-body flexing of the fuselage 302.

In this manner, the system 400 controls the aircraft 300 in real-time in response to detecting a structural anomaly in various flight conditions such as takeoff, cruise, approach and landing, and other flight condition, without an operator/pilot interaction. However, in one embodiment, an operator/pilot can suitably override/prevent action commanded by the anomaly mitigation module 408 during the various flight conditions.

The processing module 410 may comprise a processor module 412, and a memory module 414.

The processor module 412 comprises processing logic that is configured to carry out the functions, techniques, and processing tasks associated with the operation of the system 400. In particular, the processing logic is configured to support the system 400 described herein. For example, the processor module 412 may provide data from the memory module 414 to the structural anomaly detection module 402. For another example, the processor module 412, in one embodiment, provides desired positional changes from the healthy structure model formulation module 404 to the anomaly mitigation module 408, which in turn uses the raw data to calculate adjustments to be made to control surfaces and the lift surfaces, via operation of one or more of the various control mechanisms described above.

The processor module 412 also accesses data stored in various databases in the memory module 414, to support functions of the system 400. Thereby, the processor module 412 enables activating a control mechanism in the aircraft 300 in response to detecting a structural anomaly such that the structural anomaly is mitigated.

The data may comprise, for example but without limitation, an airspeed, an altitude, a desired position of control surfaces (e.g., aileron 308) and desired position of the lift surface (e.g., wing 304), real-time measurement data, a modeling error signal, an estimated mean value of the modeling error signal, an estimated variance of the modeling error signal, a measured data input, an expected data input, a computed Probability of False Alarm (Pfa), an error significance, an anomaly indication output, a user selected Pfa threshold value, a persistence threshold value, a filter time constant, and other data, as explained in more detail below.

The modeling error signal may be used to determine the existence of the structural anomaly as explained in more detail below. Data from the memory module 414 may be used to construct or update, without limitation, the estimated mean, the estimated variance of the modeling error signal, and the error significance.

The processor module 412 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 414 may be a data storage area with memory formatted to support the operation of the system 400. The memory module 414 is configured to store, maintain, and provide data as needed to support the functionality of the system 400 in the manner described below. In practical embodiments, the memory module 414 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 414 may be coupled to the processor module 412 and configured to store the data mentioned above.

Additionally, the memory module 414 may represent a dynamically updating database containing a table for updating various databases. The memory module 414 may also store, the data mentioned above, a computer program that is executed by the processor module 412, an operating system, an application program, tentative data used in executing a program, and the like.

The memory module 414 may be coupled to the processor module 412 such that the processor module 412 can read information from and write information to the memory module 414. As an example, the processor module 412 and memory module 414 may reside in respective application specific integrated circuits (ASICs). The memory module 414 may also be integrated into the processor module 412. In an embodiment, the memory module 414 may comprise a cache memory for storing temporary variables or other intermediate information during execution of instructions to be executed by the processor module 412.

Figure 6:
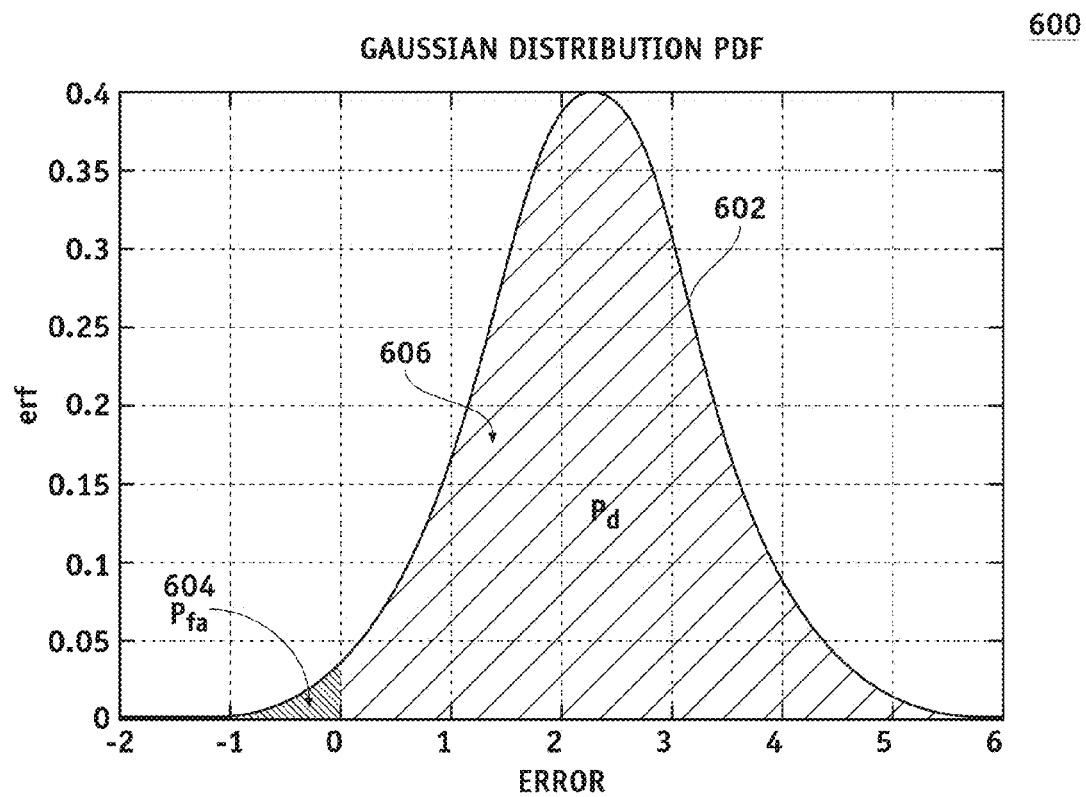
FIG. 6 is an illustration of an exemplary graph showing a Gaussian probability density function (pdf) showing an error function (erf) vs. a modeling error signal according to an embodiment of the disclosure.

FIG. 5 is an illustration of an exemplary functional block diagram of the structural anomaly detection module 402 (system 500) according to an embodiment of the disclosure. FIG. 6 is an illustration of a graph 600 showing an exemplary Gaussian probability density function (PDF) 602 showing erf vs. a modeling error signal according to an embodiment of the disclosure. System 500 is described herein with relation to the graph 600. System 500 may have functions, material, and structures that are similar to the embodiments shown in FIGS. 3-4. Therefore common features, functions, and elements may not be redundantly described here.

The system 500 may comprise a mean/variance estimator 502, an error function (erf) module 504, and a smoother 506.

The system 500 receives a measured data input measured_L 508 from the real-time measurement module 406, and an expected data input expected_L 510 from the healthy structure model formulation module 404. The measured data input measured_L 508 comprises a real-time measurement such as a measured strain corresponding to a location on the aircraft 300 during an operation of the aircraft 300.

The measured data input measured_L 508 can be measured by, for example, a strain sensor such as the MUs located on the aircraft 300 and be stored in the real-time measurement module 406. The expected data input expected_L 510 comprises the expected strain at the same location on the aircraft 300. The system 500 generates an anomaly indication output anom_detect 512 comprising a logical value. The logical value indicates either TRUE if a structural anomaly is detected, or a FALSE if a structural anomaly is not detected.

The system 500 then compares the real-time measurement to expected operation data for the location to provide a modeling error signal. In this manner, the difference between the measured data input measured_L 508, and the expected data input expected_L 510 is computed at a summing junction 514 to provide the modeling error signal 516. When the aircraft 300 is in a healthy state, the modeling error signal 516 should be about zero. A structural anomaly condition is indicated when the modeling error signal 516 is significantly away from zero.

The system 500 then determines whether a modeling error signal 516 or a significance of the modeling error signal 516 warrants indicating a structural anomaly for the aircraft 300 based on a statistical analysis. In this manner, the system 500 calculates a statistical significance of the modeling error signal 516 to provide an error significance to assess a probability that an anomalous structural indication would be in error. The system 500 indicates a structural anomaly, if a persistence of the error significance exceeds a persistence threshold value.

The mean/variance estimator 502 is configured to recursively estimate the estimated mean mean_est 528 and the estimated variance var_est 518 of the modeling error signal 516. The mean_est 528 and the var_est 518 are used to determine a statistical significance of the modeling error signal 516 thereby determining an error significance, as described below. The statistical significance of the modeling error signal 516 is determined by the estimated mean mean_est 528 and is a function of the estimated variance var_est 518 for the modeling error signal 516. Significance level (high/low) of the error significance is determined based on a user selectable Pfa threshold value 702, as explained below in the context of discussion of FIG. 7.

A normal Gaussian probability density function (PDF) 602 (FIG. 6) is assumed for a process noise in the modeling error signal 516. The PDF 602 comprises a Probability of False Alarm Pfa 604 area and a probability of detection (Pd) 606 area. Using this assumption, a probability that the modeling error signal 516 is significantly away from zero is assessed by computing the Pfa 604. In this manner, the statistical significance of the modeling error signal 516 is calculated providing the error significance. The Pfa 604 is defined by equation (1):

$$P_{fa} = \int_{-\infty}^{0} \frac{1}{\sqrt{2\pi\sigma_x^2}} e^{-\frac{(x-\mu)^2}{2\sigma_x^2}} dx \quad (1)$$

Where, $\mu$ is signal mean, and $\sigma_x$ is signal standard deviation.

The integral in equation (1) has no closed form solution. Thus equation (2) is used to approximate the Pfa 604; where the input signal (Inl) 530 (x in equation (2)), is the magnitude |μ| 522 of the mean_est 528 (estimated signal mean μ) divided by the estimated standard deviation $\sigma_x$ computed by a square root 524 of the var_est 518.

$$P_{fa} \approx \left[\frac{1}{0.661x + 0.339\sqrt{x^2 + 5.51}}\right]\frac{e^{-x^2/2}}{\sqrt{2\pi}} \quad (2)$$

As shown in FIG. 6, the Pfa 604 is computed via an integral (area 604) from negative infinity to zero. Thus, the Pfa 604 comprises a normalized measure of the significance of non-zero modeling error signal 516 providing the error significance.

The Pfa 604 in equation (2) is computed by the error function module 504. Depending on the user selectable Pfa threshold value 702 (FIG. 7), the computed Pfa value 534 (error significance) may be sent to the smoother 506 to obtain a value of the anomaly indication output anom_detect 512 determining the persistence of the error as explained in more detail in the context of discussion of FIG. 7.

Figure 7:
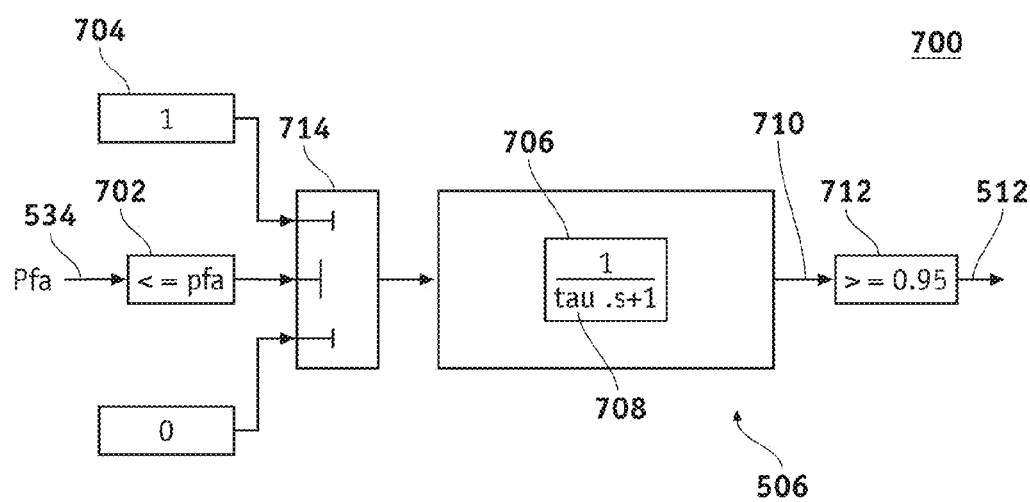
FIG. 7 is an illustration of an exemplary functional block diagram of a smoother according to an embodiment of the disclosure.

FIG. 7 is an illustration of an exemplary functional block diagram of the smoother 506 (system 700) according to an embodiment of the disclosure. If the computed Pfa value 534 falls below the user selectable Pfa threshold value 702 (indicating a high level of error significance), a unity signal 704 is passed by a switch 714 to a first order filter 706. The first order filter 706 comprises a user selectable time constant tau 708. An output 710 of the first order filter 706 is compared to a value close to 1 in a compare block 712. When the output 710 of the first order filter 706 is sufficiently close to 1, the error significance is high with sufficient persistence and an anomaly condition is transmitted to the anomaly indication output anom_detect 512 indicating the TRUE logical value. When the output 710 of the first order filter 706 is not sufficiently close to 1, the error significance is not persistently high and the anomaly condition is not transmitted to the anomaly indication output anom_detect 512, indicating the FALSE logical value.

The user selectable Pfa threshold value 702 (selected Pfa threshold value 702) and the user selectable time constant tau 708 (filter time constant 708) are tunable parameters that depend on quality of the modeling error signal 516 and tolerance for false positive indications. The quality of the modeling error signal 516 depends on a signal to noise ratio of a measurement signal such as the measured data input measured_L 508. If the measurement signal is highly corrupted by the noise, the mean_est 528 (recursive mean) and the var_est 518 (recursive variance) estimations of the modeling error signal 516 may be less accurate, which could lead to variation in the computed Pfa value 534, and, in turn, to false positive anomaly indications.

The selected Pfa threshold value 702 may be selected, for example but without limitation, within a range having values from about 0.0001 to about 0.01, or a similar range. The filter time constant 708 may be selected, for example but without limitation, within a range having values from about 0.05 seconds to about 5 seconds or more, or a similar range.

In this manner, the anomaly indication output anom_detect 512 can be coupled with measured structural data from the real-time measurement module 406 and the anomaly mitigation module 408 to limit maneuvering of a non-optimal aircraft structure to within an envelope that keeps structural loads for the aircraft 300 at substantially optimal levels.

Figure 8:
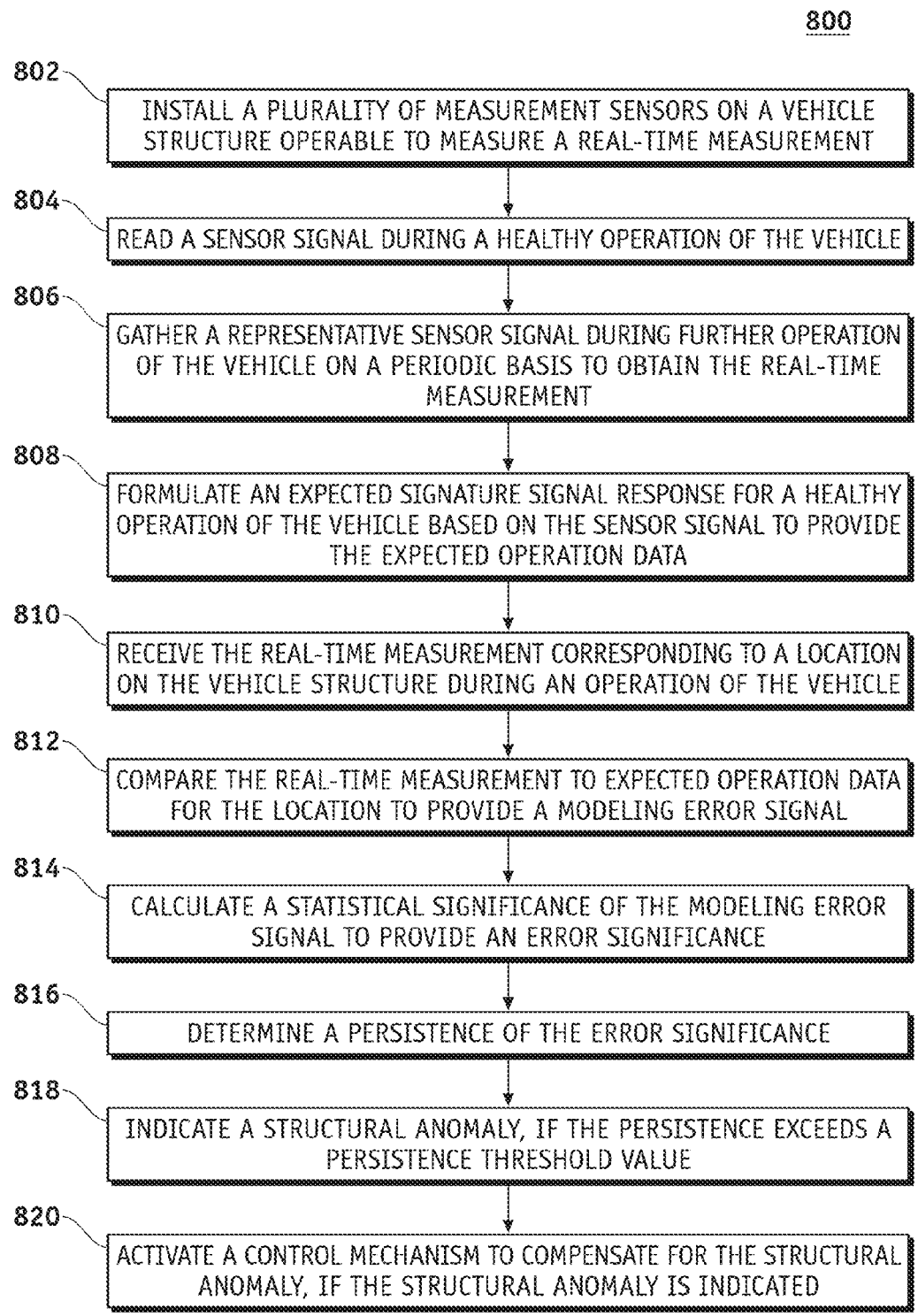
FIG. 8 is an illustration of an exemplary flowchart showing a model based vehicle structural anomaly detection process according to an embodiment of the disclosure.

FIG. 8 is an illustration of an exemplary flowchart showing a model based vehicle structural anomaly detection process 800 according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 3-7. In practical embodiments, portions of the process 800 may be performed by different elements of the system 400 such as: the structural anomaly detection module 402, the healthy structure model formulation module 404, the real-time measurement module 406, the anomaly mitigation module 408, and the processing module 410. Process 800 may have functions, material, and structures that are similar to the embodiments shown in FIGS. 3-7. Therefore common features, functions, and elements may not be redundantly described here.

Process 800 may begin by installing a plurality of measurement sensors such as the MUs 324/328/330/332/334 on a vehicle structure of a vehicle, such as the structure of the aircraft 300, that are operable to measure a real-time measurement such as the measured data input measured_L 508 (task 802).

Process 800 may continue by reading a sensor signal during a healthy operation of the vehicle (task 804).

Process 800 may continue by gathering a representative sensor signal during further operation of the vehicle on a periodic basis to obtain the real-time measurement (task 806).

Process 800 may continue by formulating an expected signature signal response for a healthy operation of the vehicle based on the sensor signal to provide the expected operation data (task 808).

Process 800 may continue by receiving the real-time measurement corresponding to a location on the vehicle structure during an operation of the vehicle (task 810).

Process 800 may continue by comparing the real-time measurement such as the measured_L 508 to expected operation data such as the expected_L 510 for the location to provide a modeling error signal such as the modeling error signal 516 (task 812). For example, expected operation data may comprise a structure twist of 7 degrees with a twist gradient of 1 degree/sec. If the real-time measurement data measures a structure twists that exceeds 7 degrees with a twist gradient greater than 1 degree/sec, the modeling error signal 516 is a nonzero value.

Process 800 may continue by calculating a statistical significance of the modeling error signal 516 to provide an error significance (task 814).

Process 800 may continue by determining a persistence of the error significance (task 816) as explained above in the context of discussion of FIG. 7.

Process 800 may continue by indicating a structural anomaly, if the persistence exceeds a persistence threshold value (task 818). The persistence threshold value may be, for example but without limitation, about 0.5, about 0.8, about 0.95, or other suitable threshold value, depending upon the tolerance for a false positive structural anomaly detection and the convergence properties of the mean_est 528 (recursive mean) and the var_est 518 (recursive variance) estimations of the modeling error signal 516 for a given application.

Process 800 may continue by activating a control mechanism to compensate for the structural anomaly, if the structural anomaly is indicated (task 820). For example, if the structure twists exceeds 7 degrees with a twist gradient greater than 1 degree/sec, the error persistence may be high causing a structural anomaly to be indicated. A control may then be initiated by the anomaly mitigation module 408 to alleviate structural stress by using a control mechanism to null out the gradient and return the example structure to a twist of 7 degrees. The control mechanism may comprise, for example but without limitation, a propulsion system, controllable lift surfaces, flight control surfaces, active flow control, shaped metal alloys or other active structural materials that expand or contract as a function of a control signal, and the like.

Additionally, if the gradient is less than about 1 deg/sec but the twist exceeds about 9 degrees with about 95% confidence, the error persistence is high causing the structural anomaly detection module 402 identifying a structural anomaly. A control is initiated by the anomaly mitigation module 408 to reduce this twist back to about 7 degrees. Similarly, as an example, the real-time measurement module 406 measures in real-time a twist of about 7 degrees with a gradient of about 1 deg/sec and when it passes through 7 degrees twist with this gradient, the twist and gradient indicate the structure may continue to stress further out of tolerance.

In response, a control is initiated by the anomaly mitigation module 408 to null out the twist gradient and drive the twist back towards 7 degrees. In an alternate example, the real-time twist may reach about 9 degrees with about 95% confidence with little to no twist gradient. In response, a control is initiated by the anomaly mitigation module 408 to reduce the structural stress back towards 7 degrees. In this manner, alleviating the structural anomaly prolongs the structural life of the aircraft 300.

Figure 9:
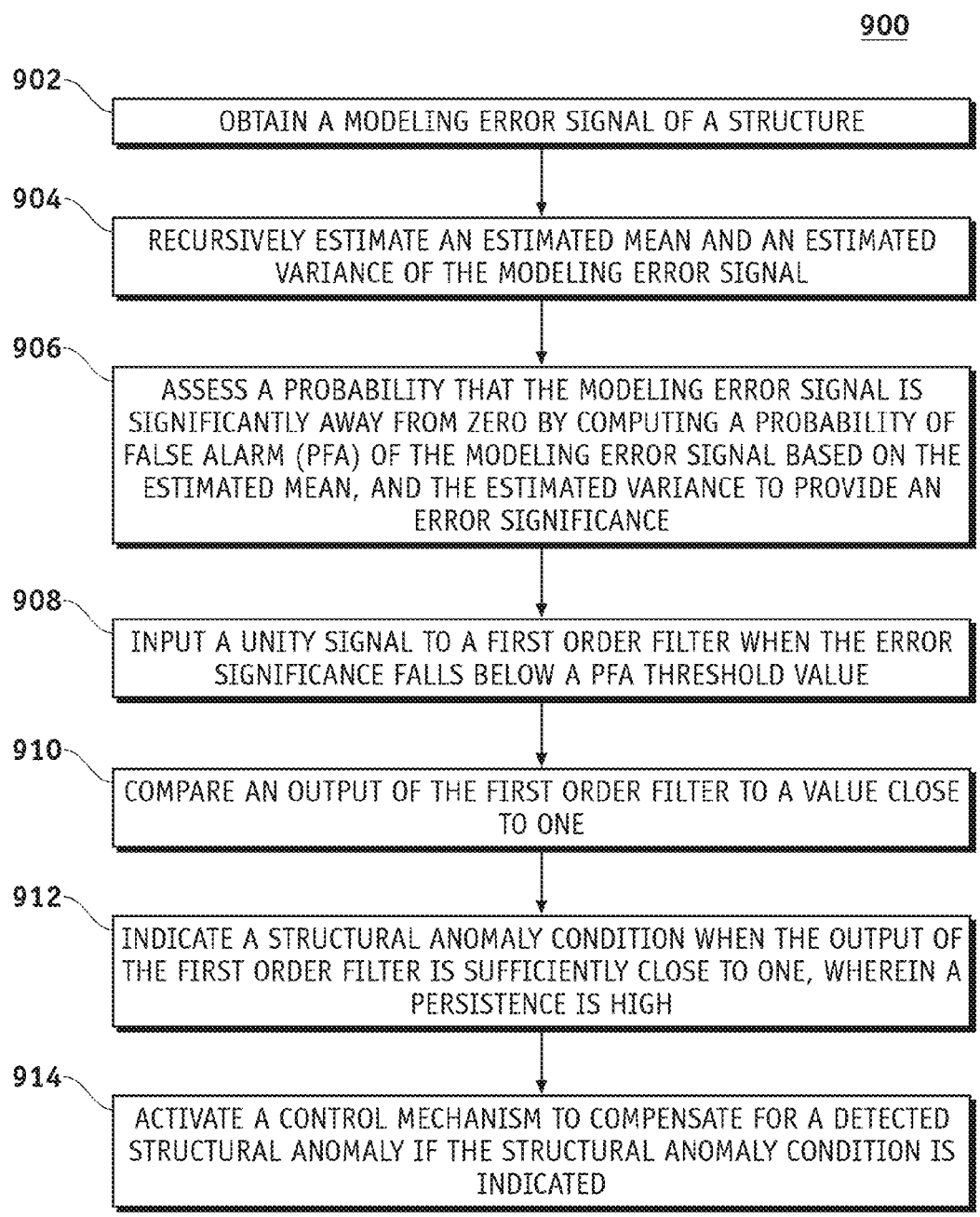
FIG. 9 is an illustration of an exemplary flowchart showing a process for alleviating a structural anomaly according to an embodiment of the disclosure.

FIG. 9 is an illustration of an exemplary flowchart showing a process 900 for alleviating a structural anomaly according to an embodiment of the disclosure. The various tasks performed in connection with process 900 may be performed mechanically, by software, hardware, firmware, a computer-readable medium having computer executable instructions for performing the process method, or any combination thereof. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein.

For illustrative purposes, the following description of process 900 may refer to elements mentioned above in connection with FIGS. 3-7. In practical embodiments, portions of the process 900 may be performed by different elements of the system 400 such as: the structural anomaly detection module 402, the healthy structure model formulation module 404, the real-time measurement module 406, the anomaly mitigation module 409, and the processing module 410. Process 900 may have functions, material, and structures that are similar to the embodiments shown in FIGS. 3-7. Therefore common features, functions, and elements may not be redundantly described here.

Process 900 may begin by obtaining a modeling error signal such as the modeling error signal 516 of a structure such as the aircraft 300 (task 902).

Process 900 may continue by an mean/variance estimator such as the mean/variance estimator 502 recursively estimating an estimated mean and an estimated variance of the modeling error signal 516 (task 904).

Process 900 may continue by an structural anomaly detection module such as the structural anomaly detection module 402 (system 500) assessing a probability that the modeling error signal 516 is significantly away from zero by an error function module such as the error function module 504 computing a Pfa such as the Pfa 604 of the modeling error signal 516 based on the estimated mean, and the estimated variance to provide an error significance (task 906). As mentioned above, the error significance provides an assessment of a probability that an anomalous structural indication would be in error. To justify a structural anomaly declaration, the error persistence is then determined.

Process 900 may continue by system 500 inputting a unity signal to a first order filter 706 such as the first order filter 706 when the error significance falls below a selected Pfa threshold value such as the user selected Pfa threshold value 702 (task 908). The user selected Pfa threshold value 702 and the user selectable time constant tau 708 of the first order filter 706 may be tunable/selectable parameters that depend on a quality of the modeling error signal 516 and tolerance for false positive indications as explained above.

Process 900 may continue by a smoother such as the smoother 506 comparing an output 710 of a first order filter such as the first order filter 706 to a value close to one (task 910).

Process 900 may continue by system 500 indicating a structural anomaly condition when the output 710 of the first order filter 706 is sufficiently close to one, wherein a persistence is high (task 912), indicating a sufficient persistence of an anomalous structural behavior to justify a structural anomaly declaration.

Process 900 may continue by an anomaly mitigation module such as the anomaly mitigation module 408 activating a control mechanism to compensate for a detected structural anomaly, if the structural anomaly condition is indicated (task 914).

In this way, a system and methods are provided for detecting and alleviating a structural anomaly.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-7 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A method for real-time model based vehicle structural anomaly detection, comprising:
monitoring an entirety of a vehicle structure in real-time;
receiving a real-time measurement corresponding to a location on the vehicle structure from among the entirety of the vehicle structure during an operation of the vehicle;
comparing the real-time measurement to expected operation data for the location to provide a modeling error signal of the vehicle structure;

calculating a statistical significance of the modeling error signal based on a Probability of False Alarm (Pfa) to provide an error significance of a vehicle structural anomaly in real-time;

determining a persistence of the error significance based on a user selectable Probability of False Alarm (Pfa) threshold value, wherein the user selectable Pfa threshold depends on a quality of the modeling error signal and a tolerance for false positive indications in real-time; and indicating the vehicle structural anomaly in real-time, if the persistence exceeds a persistence threshold value of the vehicle structure anomaly.

2. The method of claim 1, wherein the step of calculating the statistical significance of the modeling error signal further comprises:

recursively estimating an estimated mean and an estimated variance of the modeling error signal to determine whether the modeling error signal warrants indicating the vehicle structural anomaly; and assessing a probability that the modeling error signal is significantly away from zero by computing the Probability of False Alarm (Pfa) of the modeling error signal for the vehicle structural anomaly detection based on the estimated mean, and the estimated variance to provide the error significance.

3. The method of claim 1, wherein the step of determining the persistence of the error significance further comprises:

inputting a unity signal into a first order filter when the error significance falls below the user selectable Pfa threshold value and inputting a zero signal into the first order filter otherwise;

comparing an output of the first order filter to a value close to one; and indicating a structural anomaly condition when the output of the first order filter is sufficiently close to one, wherein the persistence is high, while not indicating the structural anomaly condition when the output of the first order filter is not sufficiently close to one, wherein the persistence is not high.

4. The method of claim 3, wherein the user selectable Pfa threshold value and a filter time constant of the first order filter are tunable parameters that depend on the quality of the modeling error signal and the tolerance for false positive indications.

5. The method of claim 1, further comprising activating a control mechanism to compensate for the vehicle structural anomaly, if the vehicle structural anomaly is indicated.

6. The method of claim 5, wherein the step of activating the control mechanism comprises at least one member selected from the group consisting of: a control surface actuation, a lift surface actuation, a flow control actuation, actuation of shaped memory alloys, actuation via active structural materials, and a propulsive power alteration.

7. The method of claim 1, further comprising installing a plurality of measurement sensors on the vehicle structure operable to measure the real-time measurement.

8. The method of claim 1, further comprising:

reading a sensor signal during a healthy operation of the vehicle; and formulating an expected signature signal response for a healthy operation of the vehicle based on the sensor signal to provide the expected operation data.

9. The method of claim 1, further comprising gathering a representative sensor signal during further operation of the vehicle on a periodic basis to obtain the real-time measurement.

10. The method of claim 1, wherein the structural anomaly comprise at least one member selected from the group consisting of: an in-flight operation, a stress from wind shear on a lift surface, a stress from a debris impact on a lift surface, a stress from a gust on a lift surface, a vibration on a wing, a flutter on a wing, a fuselage flexure, an excessive bending of the fuselage, a propulsion system anomaly, an excessive linear displacement, an excessive angular displacement, a structural fatigue, a control surface anomaly, and a lift surface anomaly.

11. A real-time model based structural anomaly detection system, comprising:

a structural anomaly detection module operable to:

monitor an entirety of a vehicle structure in real-time;

receive a real-time measurement corresponding to a location on the vehicle structure from among the entirety of the vehicle structure during an operation of the vehicle;

compare the real-time measurement to expected operation data for the location to provide a modeling error signal of the vehicle structure;

calculate a statistical significance of the modeling error signal based on a Probability of False Alarm (Pfa) to provide an error significance of a vehicle structural anomaly in real-time;

determine a persistence of the error significance based on a user selectable Probability of False Alarm (Pfa) threshold value if the error significance is below the user selectable Pfa threshold value, wherein the user selectable Pfa threshold on a quality of the modeling error signal and a tolerance for false positive indications in real-time; and indicate the vehicle structural anomaly in real-time, if the persistence exceeds a persistence threshold value of the vehicle structure anomaly; and an anomaly mitigation module operable to activate a control mechanism to compensate for the vehicle structural anomaly, if the vehicle structural anomaly is indicated.

12. The system of claim 11, further comprising:

a mean/variance estimator operable to recursively estimate an estimated mean and an estimated variance of the modeling error signal;

an error function module operable to assess a probability that the modeling error signal is significantly away from zero by computing a Probability of False Alarm (Pfa) of the modeling error signal based on the estimated mean, and the estimated variance to obtain the error significance; and a smoother comprising a first order filter and operable to declare an anomaly condition when an output of the first order filter is sufficiently close to one indicating the error significance is persistently high.

13. The system of claim 12, wherein the first order filter comprises the user selectable Pfa threshold value and a filter time constant that are tunable parameters based on the quality of the modeling error signal and the tolerance for false positive indications.

14. The system of claim 11, wherein the vehicle is an aircraft and the step of activating the control mechanism comprises at least one member selected from the group consisting of: a control surface actuation, a lift surface actuation, a flow control actuation, actuation of shaped memory alloys, actuation via active structural materials, and a propulsive power alteration.

15. The system of claim 11, further comprising a healthy structure model formulation module operable to:
   read a sensor signal during a healthy operation of the vehicle;
   store the sensor signal in a memory;
   formulate an expected signature signal response for a healthy operation of the vehicle based on the sensor signal to obtain the expected operation data; and
   provide the expected operation data to the structural anomaly detection module.

16. The system of claim 11, further comprising a real-time measurement module operable to:
   measure a representative sensor signal during further operation of the vehicle on a periodic basis to obtain the real-time measurement; and
   provide the real-time measurement to the structural anomaly detection module.

17. The system of claim 11, further comprising a plurality of sensors comprising at least one member selected from the group consisting of: a strain sensor, a vibration sensor, a noise sensor, a temperature sensor, and an optic sensor.

18. The system of claim 11, wherein the vehicle structural anomaly comprises at least one member selected from the group consisting of: an in-flight operation, a stress from wind shear on a lift surface, a stress from a debris impact on a lift surface, a stress from a gust on a lift surface, a vibration on a wing, a flutter on a wing, a fuselage flexure, an excessive bending of a fuselage, a propulsion system anomaly, an excessive linear displacement, an excessive angular displacement, a structural fatigue, a control surface anomaly, and a lift surface anomaly.

19. A method for alleviating a vehicle structural anomaly, comprising:
   monitoring an entirety of a vehicle structure in real-time;
   obtaining a modeling error signal of a location on the vehicle structure from among the entirety of the vehicle structure;
   assessing a probability that the modeling error signal is significantly away from zero by computing a Probability of False Alarm (Pfa) to provide an error significance of a vehicle structural anomaly; and
   determining in real-time a persistence of the error significance based on a user selectable Probability of False Alarm (Pfa) threshold value, wherein the user selectable Pfa depends on a quality of the modeling error signal and a tolerance for false positive indications in real-time, by:
      inputting a unity signal to a first order filter when the error significance falls below the user selectable Pfa threshold value and inputting a zero signal into the first order filter otherwise; and
      indicating a vehicle structural anomaly condition in real-time when an output of the first order filter is sufficiently close to one, while not indicating the vehicle structural anomaly condition when the output of the first order filter is not sufficiently close to one.

20. The method of claim 19, further comprising activating a control mechanism to compensate for the vehicle structural anomaly condition, if the vehicle structural anomaly condition is indicated.

* * * * *